Patented Jan. 1, 1924.

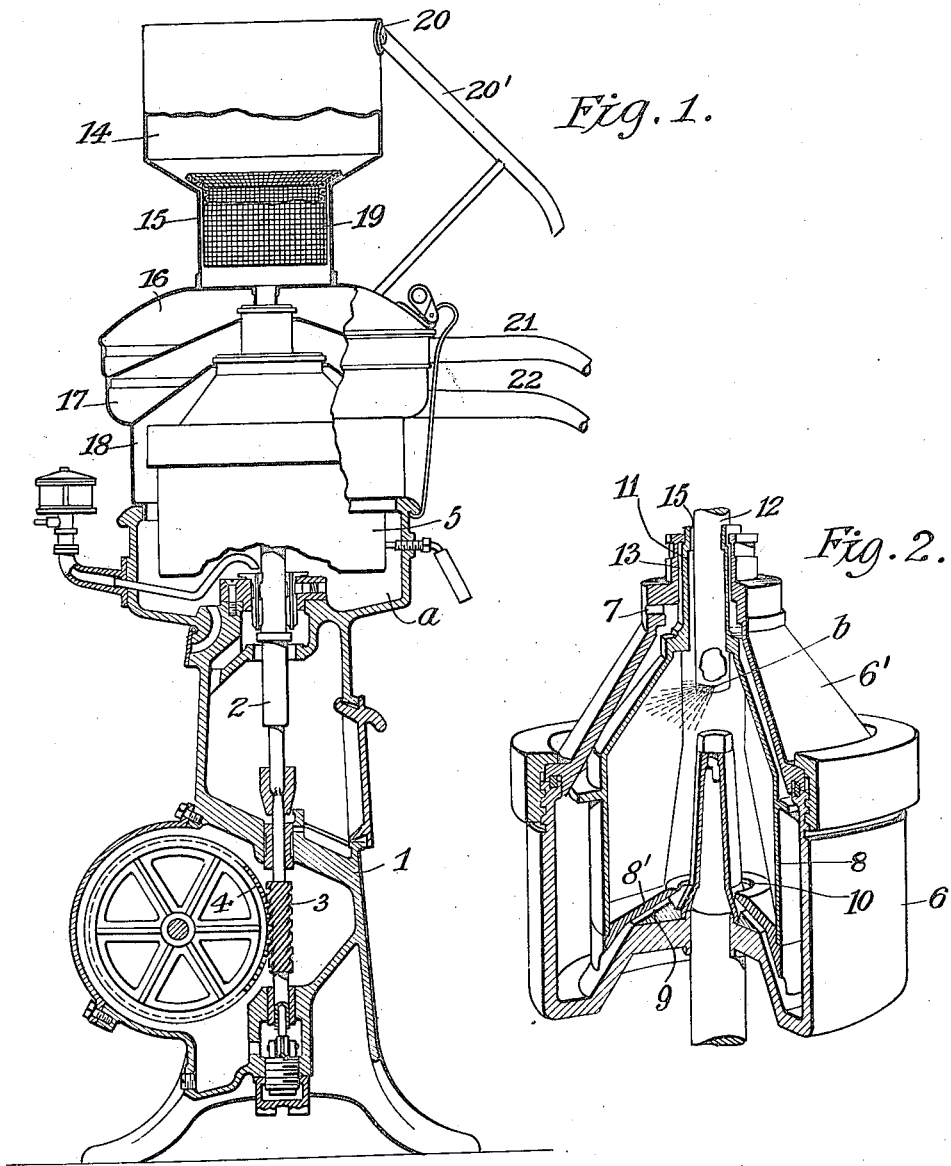

1,479,047

UNITED STATES PATENT OFFICE.

WALTER W. MOCK, OF RUTHERFORD, NEW JERSEY.

GRITLESS CARBONIFEROUS INK AND METHOD OF MAKING SAME.

Application filed February 8, 1922. Serial No. 534,873.

*To all whom it may concern:*

Be it known that I, WALTER W. MOCK, a citizen of the United States, residing at Rutherford, in the county of Bergen and State of New Jersey, have invented new and useful Improvements in Gritless Carboniferous Ink and Methods of Making Same, of which the following is a specification.

This invention relates to the production of so-called gritless printing inks, particularly of the type known as web press or news inks and has for its particular objects the economical and expeditious production of a carbon-containing ink substantially free from gritty particles, especially gritty crystalline carbon particles.

News ink, or what is often termed web press ink, is commonly made by mixing a pigment, such as carbon black, with varnish and grinding the same in a suitable mill. Inks manufactured in this manner are generally objectionable in that they contain a certain amount of gritty material a considerable portion of which was originally present in the pigment when applied, although a part of the same may have been introduced in the course of manufacture. The presence of such gritty material, which principally consists of crystallized carbon in contra-distinction to amorphous carbon, is objectionable because, it tends to lodge on the surface of the printing rolls, to clog up the sieves in the ink pipe line which feed ink from the storage tanks to the printing presses, and also tends to fill up the shallow depressions of the half-tones of the forms with a consequence that the latter print with poor definition. Moreover, ink containing such gritty material does not spread well when utilized in the modern spray printing press and other disturbances are caused which result in necessitating overtime, late delivery of newspapers in the mail and the like.

My investigations have led to the discovery that a carbon-black web press or news ink substantially free from the foregoing can be economically and expeditiously produced if the ink is subjected, after the grinding operation, to special treatment including centrifugal action, all as hereinafter set forth.

In the accompanying drawing in which is illustrated an improved machine for treating inks in accordance with my invention, Figure 1 is an elevation partially in section and Fig. 2 is a fragmentary sectional view of the bowl thereof.

Referring to the drawings and the construction shown therein the reference numeral 1 designates a hollow standard in which is mounted a vertical shaft 2 having a worm 3 adapted to be operated by a belt-driven gear 4 in the well-known manner. A rotary bowl 5 keyed to the upper end of said shaft projects into an enlarged chamber $a$. Preferably, as shown, said bowl comprises an outer shell 6 having a removable top-section 6', substantially conforming to a cone frustrum, and having an outlet orifice 7. A supplemental bowl comprising a shell 8 and a removable bottom member 8' is supported within said outer bowl and spaced sufficiently above the bottom of the latter to afford a passage 9 for liquid which escapes through the annular outlet 10 of said supplemental bowl. The neck 11 of said supplemental bowl is of sufficient size to receive an inlet conduit 12 and afford an annular overflow passage 13. Said conduit 12 is closed at its lower end and provided with a narrow slot $b$ which sprays liquid into the supplemental bowl at an angle to the axis thereof.

A super-structure of light construction, for example of tin, is fitted to the hollow standard above the chamber $a$ and the same is partitioned into an upper chamber 14, two intermediate chambers 16 and 17 and a fourth or bottom chamber 18. The upper chamber 14 is of sufficient height to afford an efficient working head for news ink delivered into the machine, for example in a machine having a bowl with an outlet of $\frac{1}{5}$ sq. in. area. The top of said chamber is preferably 14½ inches above the outlet orifice 7 of said bowl and its vertical wall is preferably 11½ inches high. Within the neck 15 of this chamber is fitted a strainer 19 for the removal of coarse particles. The chamber 14 is provided with an outlet orifice 20, preferably adjacent the top thereof, which is adapted to discharge into a conduit 20' the ink which backs-up into the chamber 14 when the inner bowl overflows due to clogging or choking thereof by gritty particles of accumulated carbon which have been separated from the ink. The chamber 16 is provided with an outlet orifice on its outer periphery which communicates directly with and is adapted to discharge into a conduit 21 the ink which backs-up into the chamber 14 when the inner bowl overflows due to clogging or choking thereof by gritty particles of accumulated carbon which have been separated from the ink.

As shown, these discharge conduits 20', 21 serve to deliver such overflow which is obviously incompletely treated ink, into a separate receptacle from that which receives the discharge issuing from orifice 7 that is discharged into conduit 22 in communication therewith. The overflowing of the ink thru said conduits 20', 21 will serve to indicate that the accumulation of carbon in the inner bowl is so large as to interfere with the proper centrifuge separation and thereby will warn the operator of the machine until the accumulated carbon has been removed.

While I have specified that preferably the top of the chamber 14 is $14\frac{1}{2}$ inches above the outlet orifice 7 of the outer bowl, it is obvious that the outlet orifice 20 may be $14\frac{1}{2}$ inches above the outlet orifice 7 and the superstructure may extend further above the outlet orifice 20 without changing the operation of the apparatus, since the chamber 14 could not be filled above its outlet orifice. However, there would be no advantage in extending the top of the superstructure above its upper outlet orifice 20, as such an extension would be merely a waste of material without adding any increased function or capacity to the chamber 14. I do not wish to confine myself to the exact limits of $14\frac{1}{2}$ inches between the orifices 7 and 20, but for a bowl with an outlet of $\frac{1}{5}$ sq. in. area, when operating on so-called news ink, the vertical distance therebetween should not be less than $11\frac{1}{2}$ inches nor more than $17\frac{1}{2}$ inches in order to obtain satisfactory results.

As an example of the method of carrying out my invention of the above described apparatus the following is given:

News ink is prepared as above stated in the well-known manner by mixing about 10 parts of carbon-black with 90 parts so-called printers' varnish, the latter consisting essentially of lubricating oil, and then grinding the mixture in a mill. The prepared ink is then delivered into a suitable reservoir from which it is tapped through a pipe to the chamber 14. For a mixture such as above described the temperature of the ink delivered to the chamber 14 should be preferably maintained between about 110° to 120° F., in order to assure a desirable degree of viscosity and prevent a minimum amount of the amorphous carbon particles from being expelled while effecting the expulsion of a maximum amount of crystalline carbon particles. The elevation of the top of the chamber 14 above the bowl to the extent above specified, insures the maintenance of the proper pressure that is required to regulate the flow of the mixture into the bowl so that it will be subjected to centrifugal action therein a sufficient length of time to cause the gritty particles to be thrown out of suspension and yet an insufficient time to effect the expulsion of the amorphous particles. When operating upon a mixture such as the foregoing, the head of the liquid in the machine should be such that the rate of flow, for a bowl of 10" in diameter when running at 4000 R. P. M. or equivalent to a peripheral speed of about 10,476' per minute, will be between 250 and 300 gallons per hour in a machine, having a bowl with an outlet of $\frac{1}{5}$ sq. in. area.

The so-called centrifugal clarifiers which are commonly used for clarifying varnish and the like are incapable of use for the manufacture of printing inks by my improved method without modification in the manner above described, particularly because the maximum head of liquid that it is possible to maintain therein is insufficient to accelerate the flow of the mixture through the bowl before very substantial quantities of the amorphous carbon particles are thrown out of suspension.

The product delivered through the outlet conduit 7 is remarkably free from gritty particles, notwithstanding the fact that the specific gravities of amorphous carbon and crystalline carbon very closely approximate each other. Apparently the centrifugal action is capable of effecting this separation of the different carbon components of the mixture, not so much because of any difference in specific gravity between these two phases of carbon but rather because of the difference in the specific surface of the respective particles and in this respect is somewhat analogous to the phenomenon of the suspension of fine particles of clay in water simultaneously with the sedimentation from the same medium of the coarser particles of clay that are of almost identical specific gravity therewith but of quite different specific surface.

My improved ink, even when prepared from grades of carbon black containing very substantial percentages of gritty carbon particles, will be almost wholly free from such gritty carbon particles, containing less than $\frac{1}{4}\%$ as compared with more than $\frac{1}{2}\%$ to several per cent in the better grades of carboniferous news inks now on the market. As a consequence my ink will, when diluted with equal parts of kerosene, flow freely thru a 150 mesh screen leaving but a small residue thereon, whereas ordinary carbon new ink will leave several times as much residue on such a screen when similarly diluted and caused to flow thru the same.

Among the advantages flowing from my invention is the fact that a comparatively cheap quality of carbon pigment, containing very substantial quantities of gritty crystalline carbon particles, can be utilized in the production of high quality news or so-called web-press inks. Furthermore, the absence of gritty crystalline carbon particles in my improved ink eliminates the necessity for frequently cleaning the printing plates, as is now commonly required when employing ordinary carboniferous news inks.

In a machine of the capacity herein described it is preferable that the area of the outlet orifice 7 of the bowl should approximate ⅕ sq. in., this being a dimension which will give satisfactory results when operating on carboniferous news inks in a centrifuge having a superstructure of the dimension described and the machine is rotating at approximately 4000 R. P. M.

Having thus described my invention, what I claim and desire to secure by U. S. Letters Patent is:

1. The method of making a carboniferous ink which consists in intimately mixing carbon pigment with an ink vehicle consisting essentially of lubricating oil, subjecting the mixture to centrifugal action while maintaining a temperature between 90° F. and 150° F. and while maintaining a sufficient rate of flow of the liquid, while so subjected to centrifugal action, to substantially prevent the expulsion of amorphous carbon particles and effect the expulsion of substantially all of the gritty crystalline carbon particles.

2. The method of making a carboniferous ink which consists in intimately mixing carbon pigment with an ink vehicle consisting essentially of lubricating oil, subjecting the mixture to centrifugal action in a centrifuge while maintaining a temperature between 90° F. and 140° F. and while maintaining a rate of flow corresponding to the treatment of from 200 to 350 gallons per hour in a centrifuge having a peripheral speed exceeding 10,000 feet per minute and a bowl with an outlet of ⅕ square inch area making 4000 revolutions per minute in order to prevent the expulsion of amorphous carbon particles and effect the expulsion of substantially all of the gritty crystalline carbon particles.

3. The method of making a carboniferous ink which consists in intimately mixing carbon black, containing substantial quantities of both amorphous and crystalline particles, with an ink vehicle consisting essentially of lubricating oil, subjecting the mixture to centrifugal action while under a sufficient head and while maintained at a temperature between 100° F. and 120° F., to prevent the expulsion of substantially all of the amorphous carbon particles and effect the expulsion of substantially all of the gritty crystalline carbon particles.

4. The method of making a carboniferous ink which consists in intimately mixing carbon pigment, composed essentially of an oily vehicle, with an ink vehicle, subjecting the mixture to centrifugal action while maintaining a temperature between 100° F. and 120° F. while maintaining a sufficient rate of flow of the liquid, while subjected to centrifugal action, to substantially prevent the expulsion of amorphous carbon particles and effect the expulsion of substantially all of the gritty crystalline carbon particles.

Signed at New York city in the county and State of New York this 26 day of January, 1922.

WALTER W. MOCK.